US011118567B2

(12) United States Patent
Kachhia et al.

(10) Patent No.: US 11,118,567 B2
(45) Date of Patent: Sep. 14, 2021

(54) SYSTEMS AND METHODS FOR PITCHING OF ROTOR BLADES

(71) Applicant: General Electric Company, Schenectady, NY (US)

(72) Inventors: Bhavesh Kachhia, Bangalore (IN); Savio Sebastian Kathayanatt, Bangalore (IN); Krishna Prashanth Anandan, Eindhoven (NL); Vamshidhar Done, Eindhoven (NL)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 16/453,037

(22) Filed: Jun. 26, 2019

(65) Prior Publication Data

US 2020/0408193 A1 Dec. 31, 2020

(51) Int. Cl.
*F03D 7/02* (2006.01)
*F03D 80/70* (2016.01)
*F03D 1/06* (2006.01)
*F03D 15/00* (2016.01)

(52) U.S. Cl.
CPC .......... *F03D 7/0224* (2013.01); *F03D 1/0675* (2013.01); *F03D 1/0691* (2013.01); *F03D 80/70* (2016.05); *F03D 15/00* (2016.05)

(58) Field of Classification Search
CPC ........ F03D 80/70; F03D 1/0691; F03D 15/00; F03D 1/0641; F03D 1/0658; F03D 1/0675; F03D 7/0224; F03D 7/0228; F03D 7/0252; F03D 7/0236; F03D 13/10; F03D 13/40; F03D 1/06; F05B 2260/79; F05B 2240/50; F05B 2240/917; F05B 2230/604; F05B 2240/302; F05B 2260/74;

(Continued)

(56) References Cited

U.S. PATENT DOCUMENTS

| 4,355,955 A | 10/1982 | Kisovec |
| 4,952,119 A | 8/1990 | Widseth |
| 7,994,650 B2 | 8/2011 | Stommel |

(Continued)

FOREIGN PATENT DOCUMENTS

| CN | 202545133 U | 11/2012 |
| EP | 2821635 A1 | 1/2015 |
| WO | 2012146745 A2 | 11/2012 |

OTHER PUBLICATIONS

Unguran et al., "Combined individual pitch and trailing edge flap control for structural load alleviation of wind turbines", 2016 American Control Conference (ACC), pp. 2307-2313, Boston, MA, USA, Jul. 6-8, 2016.

(Continued)

*Primary Examiner* — J. Todd Newton
*Assistant Examiner* — Eric J Zamora Alvarez
(74) *Attorney, Agent, or Firm* — Armstrong Teasdale LLP (57) ABSTRACT

A wind turbine includes a hub rotatable about an axis and a blade coupled to the hub. The blade includes an inner blade portion having a first end and a second end. The inner blade portion is coupled to the hub at the first end and extends radially outward from the hub to the second end. The blade further includes an outer blade portion having a first end and a second end. The first end of the outer blade portion is pivotably coupled to the second end of the inner blade portion.

19 Claims, 6 Drawing Sheets

(58) Field of Classification Search
CPC ......... F05B 2260/9011; F05D 2220/30; Y02E 10/721; Y02E 10/728; Y02E 10/723
See application file for complete search history.

(56) References Cited

U.S. PATENT DOCUMENTS

| | | |
|---|---|---|
| 8,899,869 B2 | 12/2014 | Valois |
| 2011/0255974 A1 | 10/2011 | Nanukuttan et al. |
| 2012/0051914 A1* | 3/2012 | Dehlsen ............... F03D 1/0658 416/147 |
| 2013/0236307 A1 | 9/2013 | Stege |
| 2018/0135596 A1 | 5/2018 | Herrig et al. |

OTHER PUBLICATIONS

Juettner et al., "Flexure pitch bearing concept for individual pitch control of wind turbines", Wind Energy, vol. 21, Issue: 02, pp. 129-138, 2018.
Extended European Search Report issued in European Application No. 20182037.0 dated Dec. 11, 2020; pp. 1-8.

* cited by examiner

SYSTEMS AND METHODS FOR PITCHING OF ROTOR BLADES

BACKGROUND

The field of the disclosure relates to wind turbines, and more particularly to systems for pitching rotor blades of wind turbines.

At least some known wind turbines include a rotor having multiple blades. The rotor is sometimes coupled to a housing, or nacelle, that is positioned on top of a base, for example, a tubular tower. At least some known utility grade wind turbines, i.e., wind turbines designed to provide electrical power to a utility grid, have rotor blades having predetermined shapes and dimensions. The rotor blades transform kinetic wind energy into blade aerodynamic forces that induce a mechanical rotational torque to drive one or more generators, subsequently generating electric power.

Wind turbines are exposed to large variations in wind inflow, which exerts varying loads to the wind turbine structure, particularly the wind turbine rotor and shaft. Some known wind turbines include pitch mechanisms designed to pitch the rotor blades relative to the housing based on a variety of factors such as wind speed and the rotational speed of the rotor. Pitching a rotor blade refers to rotating the blade to change the angle of attack of the wind on the blade. In at least some wind turbine systems, pitching the rotor blades to a desired angle of attack can induce stress and fatigue on components of the wind turbine system, such as, for example, pitch bearings located at the root of the blades. In addition, at least some rotor blades are generally formed as a single piece blade. As a result, shipping of such rotor blades generally requires that the rotor blades are transported in a container capable of containing the entire length of the rotor blade.

Accordingly, it is desirable to provide a wind turbine system that reduces the stress and fatigue on components of the wind turbine system during operation. In addition, it is desirable to provide a rotor blade that allows for more compact, and thereby less costly, transportation of the rotor blade.

BRIEF DESCRIPTION

In one aspect, a wind turbine is provided. The wind turbine includes a hub rotatable about an axis and a blade coupled to the hub. The blade includes an inner blade portion having a first end and a second end. The inner blade portion is coupled to the hub at the first end and extends radially outward from the hub to the second end. The blade further includes an outer blade portion having a first end and a second end. The first end of the outer blade portion is pivotably coupled to the second end of the inner blade portion.

In another aspect, a blade for use in a wind turbine system is provided. The blade includes an inner blade portion, an outer blade portion, and a rotatable element. The inner blade portion has a first end and a second end. The outer blade portion includes a first end and a second end. The first end of the outer blade portion is coupled to the second end of the inner blade portion. The rotatable element extends between the inner blade portion and the outer blade portion. The rotatable element includes a first end coupled to the inner blade portion and a second end coupled to the outer blade portion. The rotatable element second end is rotatable relative to the rotatable element first end to facilitate rotating the outer blade portion relative to the inner blade portion.

In yet another aspect, a method of assembling a blade for use in a wind turbine system is provided. The blade includes an inner blade portion having a first and second end. The blade also includes an outer blade portion having a first and second end. The method includes coupling the first end of the outer blade portion to the second end of the inner blade portion. The method also includes providing a rotatable element having a first and second end, the second end of the rotatable element being rotatable relative to the first end of the rotatable element. The method further includes coupling the first end of the rotatable element to the inner blade portion. The method also includes coupling the second end of the rotatable element to the outer blade portion such that the outer blade portion is rotatable relative to the inner blade portion.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments described herein relate to wind turbines and rotor blades for wind turbines. The wind turbine includes a hub rotatable about an axis and a rotor blade coupled to the hub. The rotor blade includes an inner blade portion having a first end and a second end. The inner blade portion is coupled to the hub at the first end and extends radially outward from the hub to the second end. The rotor blade further includes an outer blade portion having a first end and a second end. The first end of the outer blade portion is pivotably coupled to the second end of the inner blade portion. Thus, the wind turbines and rotor blades for wind turbines described herein facilitate pitching the outer blade portion of the rotor blade relative to the inner blade portion of the rotor blade. As a result, the wind turbines and rotor blades described herein reduce the load on pitch bearings located in the rotor blade root during pitching of the outer blade portion, thereby increasing the life span of the pitch bearings located in the root and reducing servicing costs for the wind turbines and rotor blades. In addition, the inner blade portion and outer blade portion of the rotor blades described herein may be disassembled for transportation, allowing for more compact shipping of rotor blades and thereby reducing the costs associated with transporting rotor blades.

Figure 1:
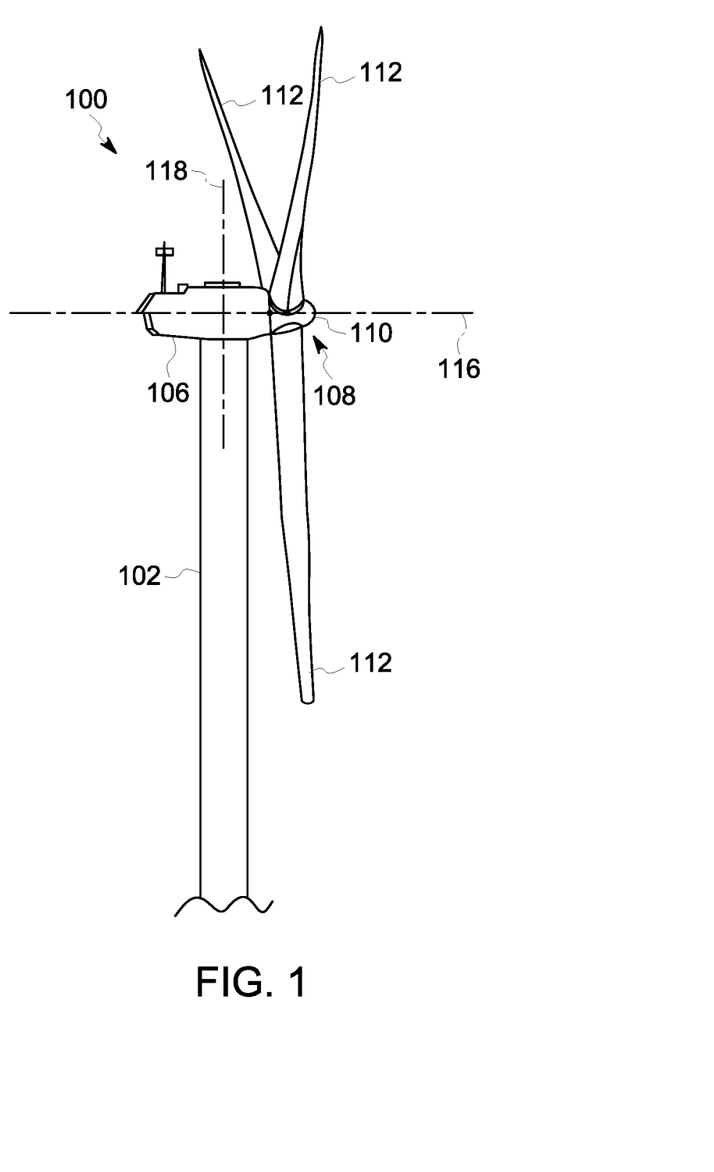
FIG. 1 is a perspective view of an exemplary wind turbine.

FIG. 1 is a schematic perspective view of an exemplary wind turbine 100. In the exemplary embodiment, wind turbine 100 is a horizontal axis wind turbine. Wind turbine 100 includes a tower 102 extending from a supporting surface (not shown), a nacelle 106 coupled to tower 102, and a rotor 108 coupled to nacelle 106. Rotor 108 has a rotatable hub 110 and a plurality of rotor blades 112 coupled to rotatable hub 110. In the exemplary embodiment, rotor 108 has three rotor blades 112. In alternative embodiments, rotor 108 has any number of rotor blades 112 that enables wind turbine 100 to function as described herein. In the exemplary embodiment, tower 102 is fabricated from tubular steel and has a cavity (not shown in FIG. 1) extending between the supporting surface and nacelle 106. In alternative embodiments, wind turbine 100 includes any tower 102 that enables wind turbine 100 to operate as described herein. For example, in some embodiments, tower 102 is any one of a lattice steel tower, guyed tower, concrete tower and hybrid tower.

In the exemplary embodiment, blades 112 are positioned about rotatable hub 110 to facilitate rotating rotor 108 when wind flows through wind turbine 100. When rotor 108 rotates, kinetic energy from the wind is transferred into usable mechanical energy, and subsequently, electrical energy. During operation, rotor 108 rotates about a horizontal axis 116 that is substantially parallel to the supporting surface. In addition, in some embodiments, rotor 108 and nacelle 106 are rotated about tower 102 on a yaw axis 118 to control the orientation of blades 112 with respect to the direction of wind. In alternative embodiments, wind turbine 100 includes any rotor 108 that enables wind turbine 100 to operate as described herein.

Figure 2:
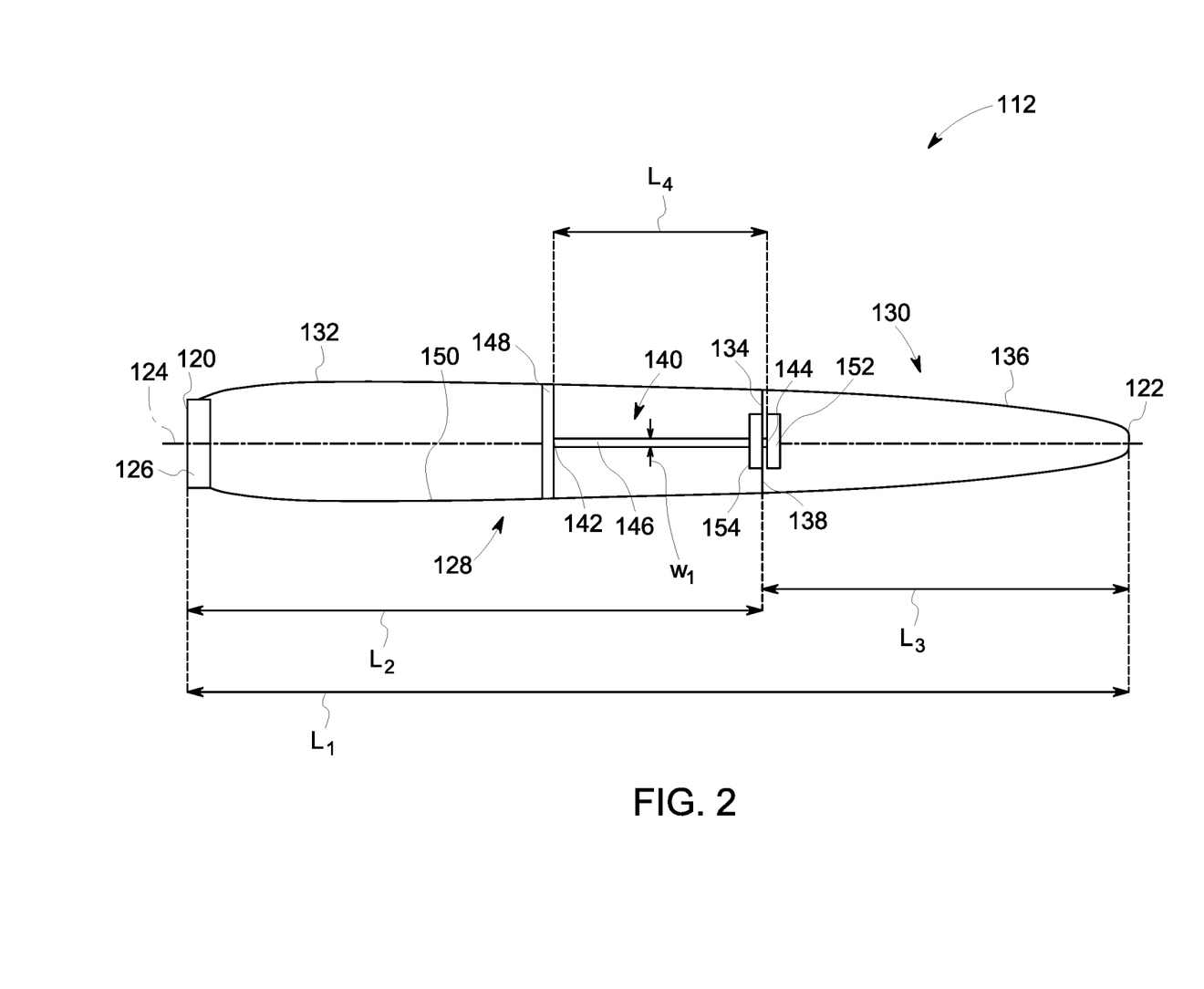
FIG. 2 is a schematic sectional view of an exemplary rotor blade for use in the wind turbine shown in FIG. 1.

FIG. 2 is a schematic sectional view of an exemplary rotor blade 112 for use in wind turbine 100 (shown in FIG. 1). In the exemplary embodiment, rotor blade 112 is configured to be coupled to rotatable hub 110 (shown in FIG. 1) at a hub end 120 and extend radially outward from rotatable hub 110 to a distal end 122. Rotor blade 112 defines a longitudinal axis 124 extending between hub end 120 and distal end 122 of rotor blade 112. In the exemplary embodiment, hub end 120 includes a hub pitching mechanism 126 for coupling rotor blade 112 to rotatable hub 110 (shown in FIG. 1). Hub pitching mechanism 126 facilitates rotating rotor blade 112 about longitudinal axis 124 (i.e., pitching rotatable blade 112) relative to rotatable hub 110 when rotor blade 112 is coupled to rotatable hub (shown in FIG. 1). In the exemplary embodiment, hub pitching mechanism 126 includes a hub actuation mechanism, such as, for example and without limitation, a hub bearing (not shown) and a gear and pinion actuation mechanism. In alternative embodiments, rotor blade 112 includes any means for connecting rotor blade 112 to rotatable hub 110 that enables wind turbine 100 (shown in FIG. 1) to function as described herein. For example, and without limitation, in some alternative embodiments, rotor blade 112 does not include a hub pitching mechanism 126.

Rotor blade 112 includes an inner blade portion 128 and an outer blade portion 130. In the exemplary embodiment, inner blade portion 128 and outer blade portion 130 are independently formed from one another. When coupled together, inner blade portion 128 and outer blade portion 130 collectively define a length, indicated generally at $L_1$, of rotor blade 112 from hub end 120 to distal end 122. In particular, in the exemplary embodiment, inner blade portion 128 includes an inner blade body 132 extending longitudinally from hub end 120, or more broadly, a first end of inner blade portion 128 to a connection end 134, or more broadly, a second end of inner blade portion 128. Outer blade portion 130 includes an outer blade body 136 extending longitudinally from a pivot end 138, or more broadly, a first end of outer blade portion, to distal end 122, or more broadly, a second end of outer blade portion 130. In alternative embodiments, outer blade portion 130 extends, at least in part, obliquely relative to inner blade portion 128. For example, and without limitation, in at least some alternative embodiments, outer blade portion 130 is coupled to inner blade portion 128 in a tilted sail-like configuration. In further alternative embodiments, outer blade portion 130 includes a folded tip (not shown) extending obliquely relative to the longitudinal axis 123. In yet further alternative embodiment, outer blade portion 130 is oriented relative to inner blade portion 128 in any manner that enables rotor blade 112 to function as described herein.

In the exemplary embodiment, inner blade portion 128 and outer blade portion 130 are generally hollowed within inner blade body 132 and outer blade body 136 respectively. In alternative embodiments, inner blade body 132 and outer blade body 136 each include a plurality of blade support structures (not shown) such as, for example and without limitation, sparcap and sparweb supports. In such embodiments, the blade support structures extend within and support inner blade body 132 and outer blade body 136 respectively. In further alternative embodiments, inner blade body 132 and outer blade body 136 include an internal filler material (e.g., a polyurethane foam) located within at least one of inner blade body 132 and outer blade body 136. In yet further alternative embodiments, at least one of inner blade portion 128 and outer blade portion 130 is non-hollow. In yet further alternative embodiments, inner blade portion 128 and outer blade portion 130 include any internal structure that enables rotor blade 112 to function as described herein.

In the exemplary embodiment, inner blade portion 128 defines a length, indicated generally at $L_2$, between hub end 120 and connection end 134. Outer blade portion 130 defines a length, indicated generally at $L_3$, between pivot end 138 and distal end 122. In the exemplary embodiment, the length $L_2$ of inner blade portion 128 is greater than the length $L_3$ of outer blade portion 130. More specifically, in the exemplary embodiment, the length $L_1$ of rotor blade 112 is approximately 65 meters, the length $L_2$ of inner blade portion 128 is approximately 40 meters, and the length $L_3$ of outer blade portion 130 is approximately 25 meters. In alternative embodiments, inner blade portion 128 and outer blade portion 130 have any lengths $L_2$, $L_3$ that enable rotor blade 112 to function as described herein. In the exemplary embodiment, inner blade portion 128 and outer blade portion 130 lengths $L_2$, $L_3$ collectively define the length $L_1$ of rotor blade 112. In alternative embodiments, rotor blade 112 includes at least one or more additional blade portions (not shown) extending along the length $L_1$ of rotor blade 112 in addition to inner blade portion 128 and outer blade portion 130.

In the exemplary embodiment, outer blade portion 130 is pivotably coupled to inner blade portion 128. In other words, in the exemplary embodiment, outer blade portion 130 is coupled to inner blade portion 128 such that outer blade portion 130 is rotatable with respect to inner blade portion 128. In particular, outer blade portion 130 is configured for bi-directional (e.g., clockwise and counter clockwise) rotation relative to inner blade portion 128. In alternative embodiments outer blade portion 130 is configured for multidirectional (e.g., tilt and yaw) pivoting relative to inner blade portion 128. In the exemplary embodiment, outer blade portion 130 is configured to rotate between +/− one degree and +/− three degrees about longitudinal axis 124 relative to inner blade portion 128 during operation of wind turbine 100 (shown in FIG. 1). In alternative embodiments, outer blade portion 130 is configured to rotate at least +/− five degrees about longitudinal axis 124 relative to inner blade portion 128. In alternative embodiments, outer blade portion 130 is configured to rotate any angle about longitudinal axis 124 relative to inner blade portion 128 that enables rotor blade 112 to function as described herein.

In the exemplary embodiment, pivotably coupling outer blade portion 130 to inner blade portion 128 facilitates rotating (i.e., pitching) of outer blade portion 130 about longitudinal axis 124 while inner blade portion 128 is maintained in position (i.e., not rotated) with respect to longitudinal axis 124. Pivotably coupling outer blade portion 130 to inner blade portion 128 further facilitates rotating outer blade portion 130 relative to inner blade portion 128 while inner blade portion 128 and outer blade portion 130 are each rotated about longitudinal axis 124 by hub pitching mechanism 126. In other words, in the exemplary embodiment, hub pitching mechanism 126 is configured to rotate entire rotor blade 112 (i.e., rotate inner blade portion 128 and outer portion 130 in synchronous rotation with one another) about longitudinal axis 124 and outer blade portion 130 is further controllable to rotate about longitudinal axis 124 relative to inner blade portion 128. In alternative embodiments where outer blade portion 130 extends, at least in part, obliquely from inner blade portion 128, pivotably coupling outer blade portion 130 to inner blade portion 128 facilitates rotating outer blade portion 130 about a longitudinal axis (not shown) of outer blade portion 130.

In the exemplary embodiment, rotor blade 112 includes a bearing 140, or more broadly, a rotatable element. As used herein throughout the specification and claims, the terms "rotatable element" and "bearing element" are understood to have substantially the same meaning. Bearing 140 includes a first end 142 coupled to inner blade portion 128 and a second end 144 coupled to outer blade portion 130. Bearing element 140 includes a bearing body 146 extending longitudinally between bearing first end 142 and bearing second end 144. Bearing second end 144 is rotatable about longitudinal axis 124 relative to bearing first end 142 to facilitate rotating, tilting, or other similar movements of outer blade portion 130 relative to inner blade portion 128. In particular, in the exemplary embodiment, bearing body 146 is configured for elastic deformation about longitudinal axis 124 (i.e., twist about the length of bearing body 146 between bearing first end 142 and bearing second end 144) to facilitate rotating bearing second end 144 relative to bearing first end 142. More specifically, in the exemplary embodiment, bearing element 140 is an elastic flexure bearing and is composed of an elastic material capable of repeatable rotational flexing without damaging or disintegrating bearing body 146. In the exemplary embodiment, bearing body 146 is formed of a composite material. In alternative embodiments, bearing body 146 is formed of any material that enables bearing element 140 to function as described herein. For example, and without limitation, in some alternative embodiments, bearing element 140 is formed of at least one of a metallic, non-metallic, polymeric composite, and metal composite material.

In the exemplary embodiment, bearing element 140 is configured for low torsional resistance (i.e., low resistance to rotational deformation about longitudinal axis 124) and relatively high resistance to bending (i.e., high resistance to oblique deformation with respect to longitudinal axis 124). As a result, in the exemplary embodiment, bearing element 140 provides structural support to outer blade portion 130 with respect to various forces (e.g., wind loads and centrifugal loads) acting on outer blade portion 130 during use of wind turbine 100 (shown in FIG. 1). In addition, bearing element 140 facilitates pitching outer blade portion 130 relative to inner blade portion 128 during use of wind turbine 100 (shown in FIG. 1).

In the exemplary embodiment, outer blade portion 130 is coupled to inner blade portion 128 via bearing element 140 such that a gap 141 (shown in FIG. 3) is defined between connection end 134 of inner blade portion 128 and pivot end 138 of outer blade portion 130. Gap 141 allows for reduced static and kinetic friction between inner blade portion 128 and outer blade portion 130 to facilitate pitching outer blade portion 130. In alternative embodiments, gap 141 is sealed by a flexible membrane (not shown). In further alternative embodiments, inner blade portion 128 is coupled to outer blade portion 130 in any manner that enables rotor blade 112 to function as described herein.

In the exemplary embodiment, inner blade portion 128 includes a support structure 148 extending within inner blade body 132. Support structure 148 is coupled to inner blade body 132 at least two points of contact with inner blade body 132. Support structure 148 is coupled to inner blade body 132 at a point longitudinally between hub pitching mechanism 126 and connection end 134. Thus, in the exemplary embodiment, the pivotable coupling between inner blade portion 128 and outer blade portion 130 via bearing element 140 does not interfere with hub pitching mechanism 126. In alternative embodiments, support structure 148 is coupled to inner blade body 132 in any manner that enables rotor blade 112 to function as described herein. In the exemplary embodiment, support structure 148 is shaped complementary to inner blade body 132. More specifically, in the exemplary embodiment, support structure 148 defines an outer perimeter that corresponds to an inner surface 150 of inner blade body 132 at the point of inner blade body 132 at which support structure 148 is coupled. In other words, in the exemplary embodiment, support structure 148 is sized to be in contact with inner blade body 132 along the entire perimeter of support structure 148. In alternative embodiments, support structure 148 is embedded in inner blade body 132. In further alternative embodiments, support structure 148 is shaped and sized in any manner that enables rotor blade 112 to function as described herein. In the exemplary embodiment, support structure 148 is formed of a polymer based composite material. In alternative embodiments, support structure 148 is formed of any material that enables support structure 148 to function as described herein. For example, and without limitation, in some alternative embodiments, support structure 148 is formed of at least one of a polymer, metal and/or metal alloy, and metallic composite material.

In the exemplary embodiment, bearing first end 142 is coupled to support structure 148. In particular, bearing element 140 is fixedly coupled to support structure 148 such that bearing first end 142 is not rotatable with respect to support structure 148. Bearing body 146 extends away from support structure 148 along longitudinal axis 124 towards to outer blade portion 130. Bearing body 146 defines a width, indicated generally at $W_1$, and a height (e.g., extending into the page and out of the page). In alternative embodiments, bearing body 146 includes a tubular or polygonal cross-section. In the exemplary embodiment, the height of bearing body 146 (not shown) is greater than the width $W_1$ of bearing body 146 such that bearing body 146 has a generally rectangular cross section. Bearing body 146 defines a length, indicated generally at $L_4$, extending between bearing first end 142 and bearing second end 144. In the exemplary embodiment, bearing element 140 is positioned within inner blade portion 128 and outer blade portion 130 such that bearing body length $L_4$ is substantially parallel to longitudinal axis 124 of rotor blade 112. In alternative embodiments, bearing body 146 has any shape that enables rotor blade 112 to function as described herein. For example, and without limitation, in some alternative embodiments, bearing body 146 is curved along the length $L_4$ of bearing body 146.

In the exemplary embodiment, rotor blade 112 includes a pitching device 152 coupled to outer blade portion 130 and an inner hub 154 coupled to inner blade portion 128. Bearing body 146 extends through inner hub 154 and is integrally formed with pitching device 152 at bearing second end 144. In alternative embodiments, bearing element 140 is removably attached to pitching device 152. An actuation mechanism (not shown) is configured to impart relative motion on outer blade portion 130 relative to inner blade portion 128. More specifically, the actuation mechanism is configured to drive rotation of pitching device 152 relative to inner hub 154 to drive rotation of bearing second end 144 relative to bearing first end 142. In the exemplary embodiment, the actuation mechanism includes a gear and pinion (not shown), anchored to the inner hub, for driving rotation of pitching device 152 relative to inner hub 154. In alternative embodiments, the actuation mechanism may be any one of a motor drive, hydraulic actuator, and pneumatic actuator. In yet further alternative embodiments, rotor blade 112 includes any actuation mechanism that enables rotor blade 112 to function as described herein. For example, as described in greater detail below with respect to FIGS. 5 and 6, in some alternative embodiments, the actuation mechanism may include a motorized cable system.

In the exemplary embodiment, during operation of wind turbine 100 (shown in FIG. 1), hub pitching mechanism 126 may be controlled to pitch the entire rotor blade 112 (e.g., pitch inner blade portion 128 and outer blade portion 130 relative to rotatable hub 110). In addition, the actuation mechanism (not shown) may be controlled to pitch only outer blade portion 130 of rotor blade 112.

Figure 3:
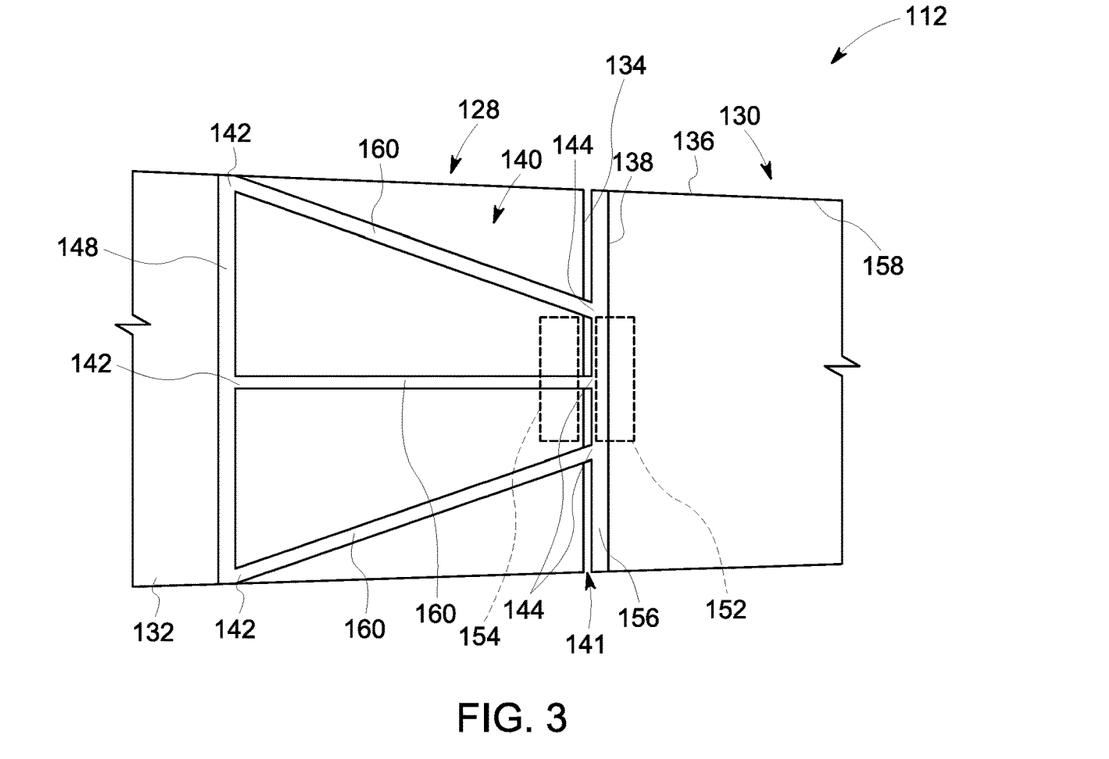
FIG. 3 is an enlarged schematic sectional view of an alternative rotor blade for use in the wind turbine shown in FIG. 1.
Figure 4:
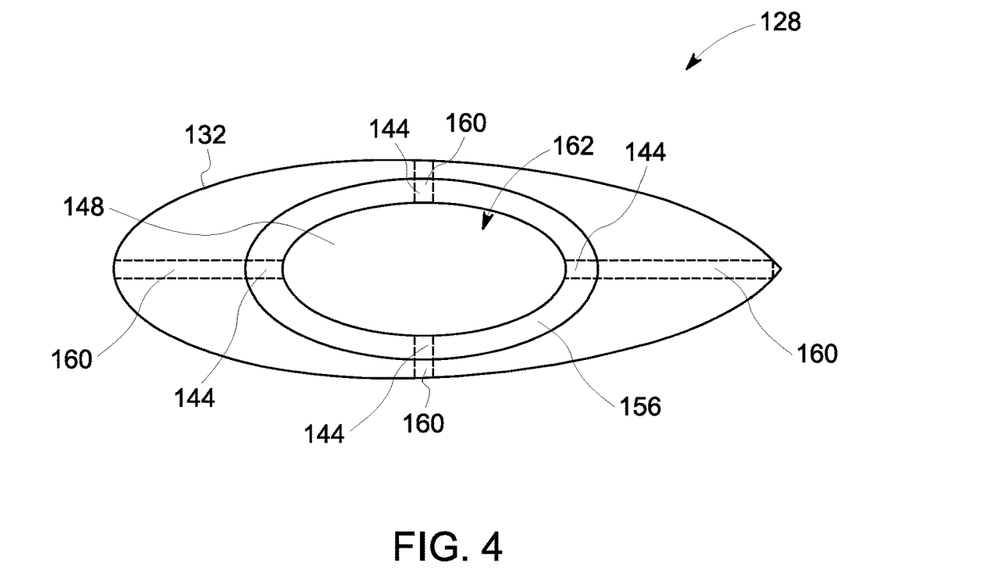
FIG. 4 is a schematic end view of a portion of the alternative rotor blade shown in FIG. 3.

FIG. 3 is an enlarged schematic sectional view of an alternative rotor blade 112 for use in wind turbine 100 (shown in FIG. 1). FIG. 4 is a schematic end view of a portion of alternative rotor blade 112 shown in FIG. 3. Alternative rotor blade 112 shown in FIGS. 3 and 4 is substantially similar to rotor blade 112 described above with respect to FIG. 2, except as described below.

In the exemplary embodiment, rotor blade 112 includes a pivot structure 156 coupled to outer blade portion 130. Pivot structure 156 is shaped in correspondence with outer blade body 136. More specifically, in the exemplary embodiment, pivot structure 156 defines an outer perimeter that corresponds to an inner surface 158 of outer blade body 136 at the point of outer blade body 136 at which pivot structure 156 is coupled (e.g., pivot end 138). In other words, in the exemplary embodiment, support structure 148 is sized to be in contact with inner blade body 132 along the entire perimeter of support structure 148. In alternative embodiments, pivot structure 156 is coupled to outer blade body 136 at least two points of contact with outer blade body 136. In yet further embodiments, pivot structure 156 is coupled to outer blade body 136 in any manner that enables rotor blade 112 to function as described herein.

In the exemplary embodiment, bearing element 140 includes four bearing bars 160 (each shown in FIG. 4) each coupled to support structure 148 at respective first ends 142 (shown in FIG. 3). More specifically, in the exemplary embodiment, bearing bars 160 are each coupled to support structure 148 adjacent the perimeter of support structure 148 (i.e., adjacent inner blade body 132). In alternative embodiments, bearing element 140 includes any number of bearing bars 160 that enables rotor blade 112 to function as described herein. For example, and without limitation, in alternative embodiments, the number and placement of bearing bars 160 are based on a desired torsional stiffness and/or bending stiffness of bearing element 140. In particular, increasing the number of bearing bars 160 increases the torsional stiffness of bearing element (i.e., increasing the drive power necessary to impart rotational movement between outer blade portion 130 and inner blade portion 128) while also increasing the bending stiffness of rotor blade 112 (i.e., providing increased resistance against bending between inner blade portion 128 and outer blade portion 130). In the exemplary embodiment, bearing bars 160 are each coupled to pivot structure 156 at respective second ends 144 and each extend obliquely relative to longitudinal axis 124 between first ends 142 and second ends 144. In other words, in the exemplary embodiment, bearing bars 160 generally converge at pivot structure 156. In alternative embodiments, bearing bars 160 are coupled to inner blade portion 128 and outer blade portion 130 in any manner that enables rotor blade 112 to function as described herein.

Referring to FIG. 4, in the exemplary embodiment, inner blade portion 128 and pivot structure 156 of alternative rotor blade 112 are shown. In the exemplary embodiment, pivot structure 156 is annular, defining an inner opening, indicated generally at 162, through which support structure 148 is visible. More specifically, pivot structure 156 is shaped as an annular oval or circular in correspondence with the cross section of outer blade portion 130. Bearing bars 160 are each coupled to pivot structure 156 at second ends 144 such that second ends 144 are substantially circumferentially spaced about pivot structure 156. In alternative embodiments, bearing bars 160 extend between support structure 148 and pivot structure 156 in any manner that enables rotor blade 112 to function as described herein.

Referring back to FIG. 3, in the exemplary embodiment, pitching device 152 and inner hub 154 are shown in broken lines to reveal internal connections between bearing bars 160 and pivot structure 156. More specifically, in the exemplary embodiment, pitching device 152 is coupled to pivot structure 156. Pitching drive 152 is configured to drive rotation of outer blade portion 130 relative to inner blade portion 128 in substantially the same manner as described above with respect to FIG. 2. In particular, an actuation mechanism (not shown) is coupled to pitching device and is configured to drive rotation of pitching device 152 relative to inner hub 154 to drive rotation of bearing second ends 144 relative to bearing first ends 142. In alternative embodiments, pitching device 152 and inner hub 154 are configured in any manner that enables rotor blade 112 to function as described herein. In further alternative embodiments, rotor blade 112 does not include at least one of pitching device 152 and inner hub 154.

Figure 5:
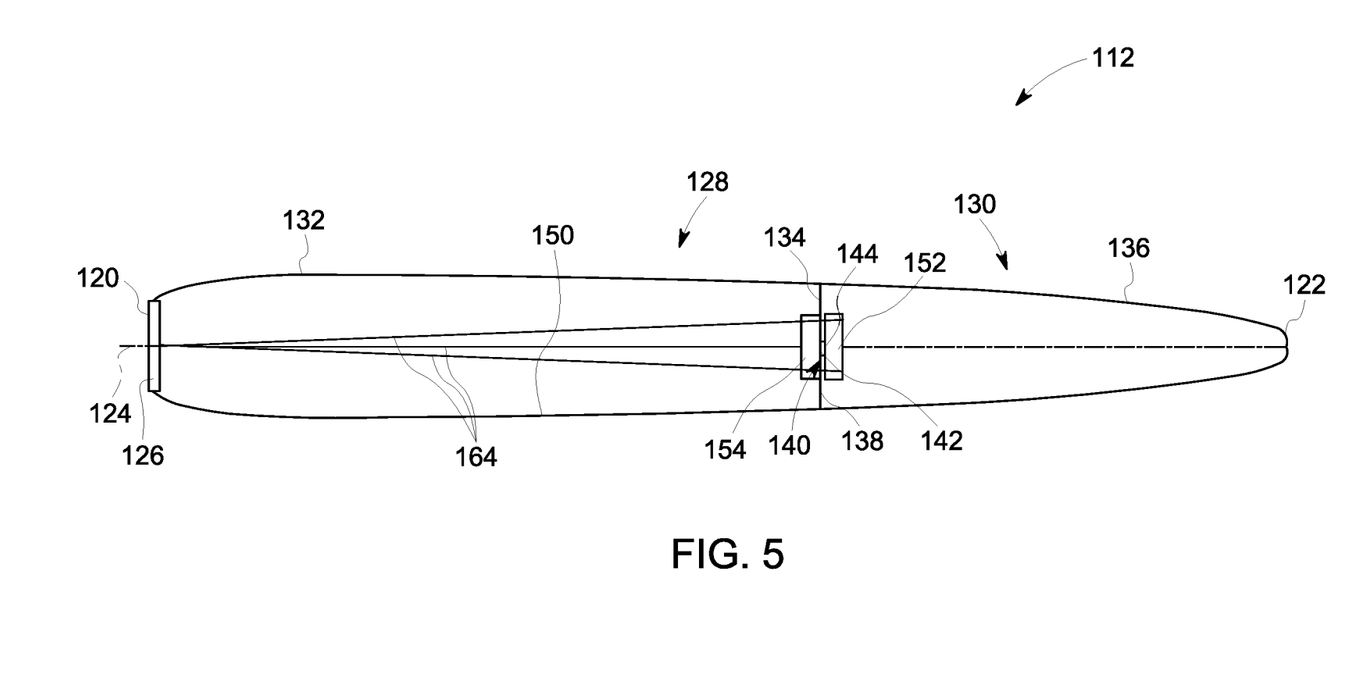
FIG. 5 is a schematic sectional view of a further alternative rotor blade for use in the wind turbine shown in FIG. 1.

FIG. 5 is a schematic sectional view of a further alternative rotor blade 112 for use in wind turbine 100 (shown in FIG. 1). Alternative rotor blade 112 shown in FIG. 5 is substantially similar to rotor blade 112 described above with respect to FIG. 2, except as described below.

In the exemplary embodiment, rotor blade 112 includes a plurality of cables 164. More specifically, in the exemplary embodiment, rotor blade 112 includes three cables 164 coupled at hub end 120 of inner blade portion 128 and extending through inner blade body 132 to outer blade portion 130. In alternative embodiments, rotor blade 112 includes any number of cables that enable rotor blade to function as described herein.

In the exemplary embodiment, bearing element 140 extends between inner hub 154 and pitching device 152. More specifically, in the exemplary embodiment, bearing first end 142 is coupled to inner hub 154 and bearing second end 144 is coupled to pitching device 152. In the exemplary embodiment, bearing element 140 is a pitch bearing, configured to facilitate rotating bearing second end 144 relative to bearing first end 142. Pitching device 152 is coupled to outer blade portion 130. As a result, rotation of bearing second end 144 relative to bearing first end 142 facilitates rotation of outer blade portion 130 relative to inner blade portion 128 about longitudinal axis 124.

In the exemplary embodiment, cables 164 are coupled to hub end 120 of inner blade portion 128, and extend therefrom to pitching device 152. In the exemplary embodiment, the actuation mechanism (not shown) is positioned coupled to inner hub 154. In alternative embodiments, the actuation mechanism (not shown) is located in any component of wind turbine 100 that enables actuation mechanism (not shown) to function as described herein. For example, and without limitation, in some alternative embodiments, the actuation mechanism is positioned adjacent pitching device 152.

In the exemplary embodiment, cables 164 are coupled to pitching device 152 such that cables are substantially equidistantly spaced about the circumference of pitching device 152 to facilitate imparting rotational movement. More specifically, in the exemplary embodiment, bearing element 140 is preloaded by cables 164. In other words, cables 164 apply an axial load on bearing element 140 to stabilize positioning of outer blade portion 130 relative to inner blade portion 128 and to drive pitching of outer blade portion 130. Cables 164 are maintained in substantially equal tension to maintain rotational alignment of outer blade portion 130 relative to inner blade portion 128. The actuation mechanism (not shown), is configured to impart rotational movement to pitching device 152 relative to inner hub 154, thereby imparting rotation in bearing second end 144 relative to bearing first end 142 to facilitate rotating outer blade portion 130 relative to inner blade portion 128. In alternative embodiments, cables 164 are coupled to pitching device 152 in any manner that enables rotor blade 112 to function as described herein.

Figure 6:
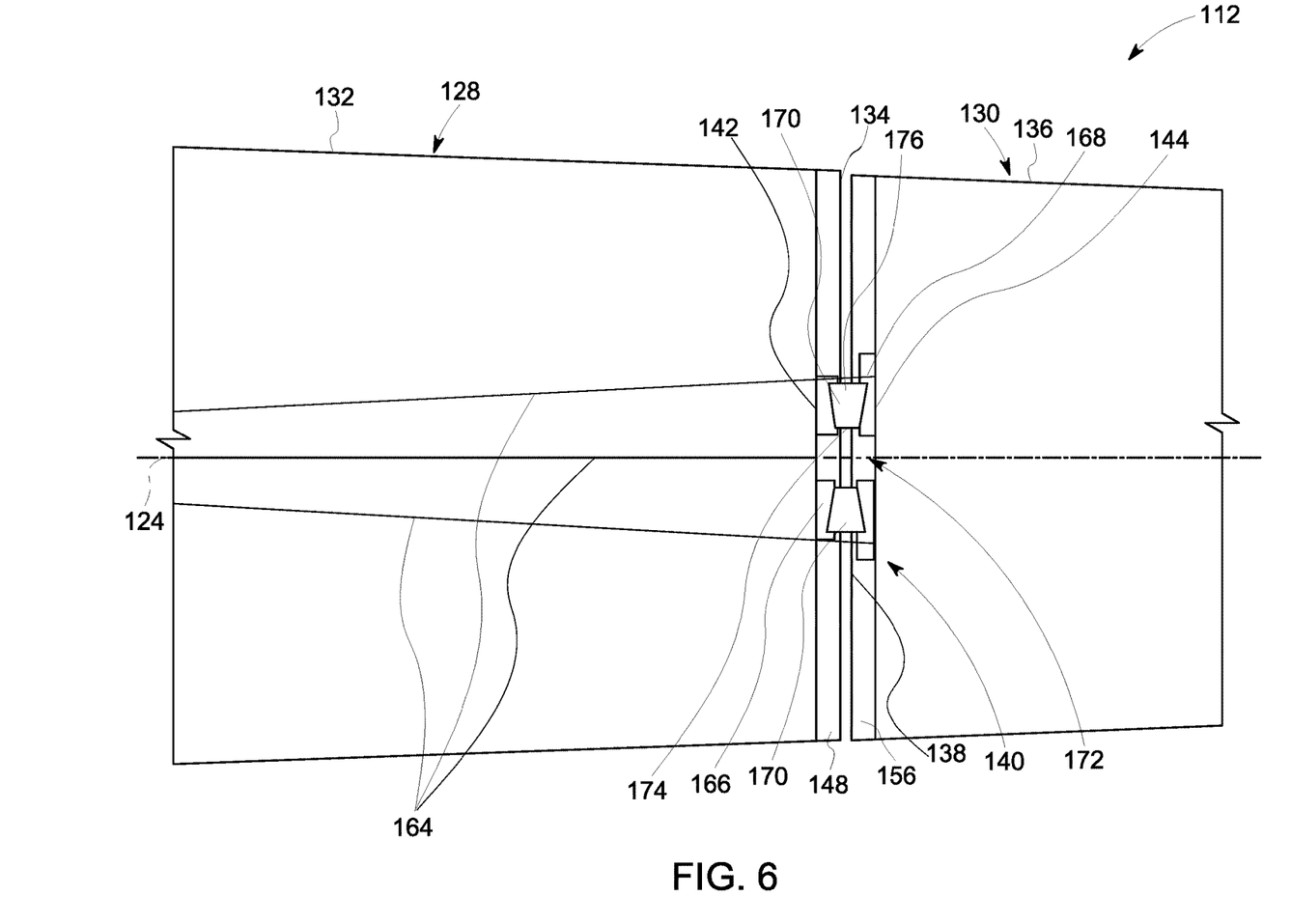
FIG. 6 is a schematic sectional view of a yet further alternative rotor blade for use in the wind turbine shown in FIG. 1.

FIG. 6 is a schematic sectional view of a yet further alternative rotor blade 112 for use in wind turbine 100 (shown in FIG. 1). Alternative rotor blade 112 shown in FIG. 6 is substantially similar to rotor blade 112 described above with respect to FIG. 5, except as described below.

In the exemplary embodiment, bearing element 140 is a roller bearing. In particular, in the exemplary embodiment, bearing element 140 is a tapered roller bearing. Bearing element 140 is configured to withstand large axial compressive loads (i.e., compressive loads along longitudinal axis 124 of rotor blade 112) during operation of wind turbine 100 (shown in FIG. 1). In particular, bearing element 140 includes an inner cup 166, an outer cup 168, and a plurality of tapered roller elements 170 coupled between inner cup 166 and outer cup 168. In the exemplary embodiment, inner cup 166 defines bearing first end 142 and outer cup 168 defines bearing second end 144.

In the exemplary embodiment, inner cup 166 is coupled to inner blade portion 128 and outer cup 168 is coupled to outer blade portion 130. In particular, in the exemplary embodiment, support structure 148 is coupled to inner blade body 132 at connection end 134 of inner blade portion 128. Outer blade portion 130 includes pivot structure 156 coupled to outer blade body 136 at pivot end 138 of outer blade portion 130. Inner cup 166 is fixedly coupled to support structure 148 and outer cup 168 is fixedly coupled to pivot structure 156. Roller elements 170 are configured to rotate between inner cup 166 and outer cup 168.

In the exemplary embodiment, inner cup 166 and outer cup 168 define a bearing bore, indicated generally at 172. Roller elements 170 each include a bore end 174 and an outer end 176. For each of roller elements 170, bore end 174 is located adjacent bearing bore 172 and roller elements 170 extend radially outward therefrom to outer ends 176. In the exemplary embodiment, roller elements 170 are tapered between bore end 174 and outer end 176. In alternative embodiments, bearing element 140 is an angular contact bearing. In further alternative embodiments, bearing element 140 is any rotatable element that enables rotor blade 112 to function as described herein.

In the exemplary embodiment, rotor blade 112 includes three cables 164 extending from hub end 120 (shown in FIG. 5) of rotor blade 112 to outer cup 168. In alternative embodiments, rotor blade 112 includes any number of cables 164 that enable rotor blade 112 to function as described herein. Cables 164 are operable to drive rotation of outer blade portion 130 relative to inner blade portion 128 in substantially the same manner as described above with respect to FIG. 5. In particular, in the exemplary embodiment, cables 164 are coupled to outer cup 168 at substantially even tension. In particular, even tension is enabled by incorporating springs (not shown) at one or both ends of cables 164. An actuation mechanism (not shown) may also be used to adjust the tension of cables 164 relative to one another. In alternative embodiments, actuation mechanism (not shown) is configured to drive rotation of outer blade portion 130 relative to inner blade portion 128 in any manner that enables rotor blade 112 to function as described herein.

Figure 7:
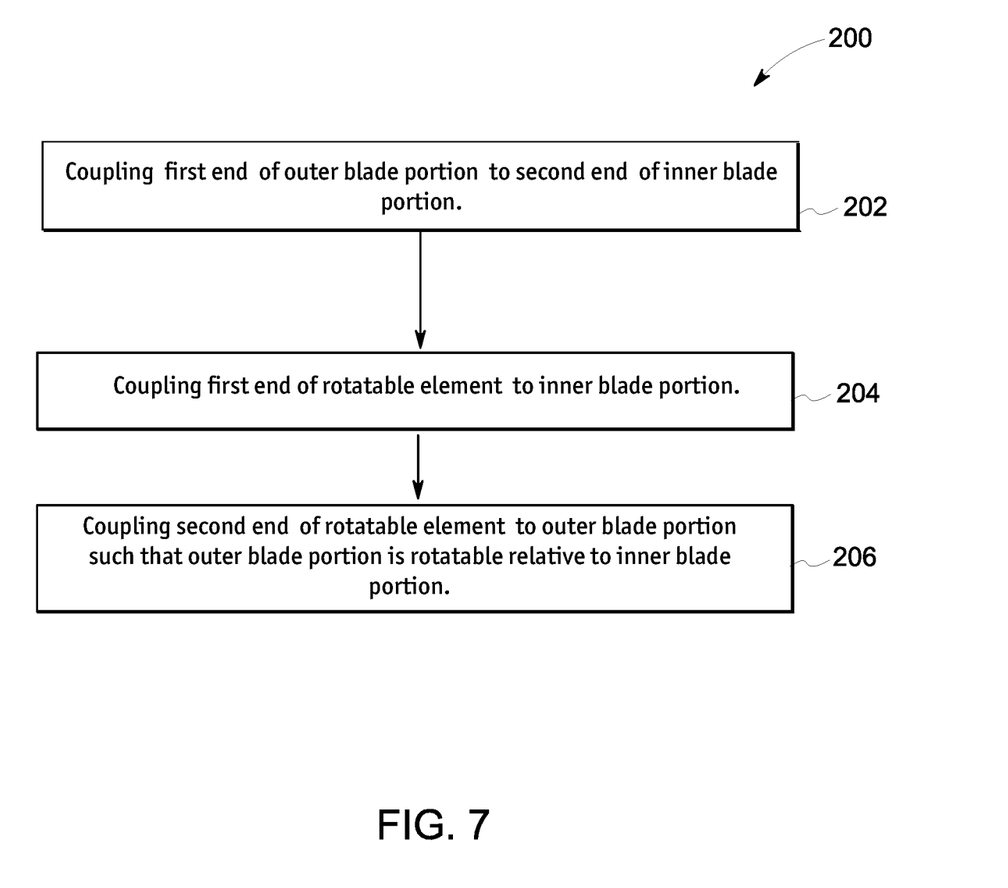
FIG. 7 is a flow chart of an exemplary method of assembling a rotor blade for use in the wind turbine shown in FIG. 1.

FIG. 7 is a flow diagram of an exemplary method 200 of assembling rotor blade 112 for use in wind turbine 100 (shown in FIG. 1). Blade 112 includes inner blade portion 128 having a first and second end 120, 134 (each shown in FIG. 2). Blade 112 also includes outer blade portion 130 having a first and second end 138, 122 (each shown in FIG. 2). Method 200 includes coupling 202 first end 138 of outer blade portion 130 to second end 134 of inner blade portion 128. Method 200 also includes coupling 204 first end 142 of rotatable element 140 to inner blade portion 128. Method 200 includes coupling 208 second end 144 of rotatable element 140 to outer blade portion 130 such that outer blade portion 130 is rotatable relative to inner blade portion 128.

An exemplary technical effect of the methods, systems, and apparatus described herein includes at least one of: (a) improved lifespan of wind turbine components; (b) reduced maintenance and servicing for wind turbine components; (c) improved modularity of rotor blades; and (d) improved control over pitching of rotor blades.

Exemplary embodiments of wind turbines, rotor blades for use in wind turbine systems, and methods for assembling rotors for use in wind turbine systems are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the wind turbine system as described herein. Rather, the exemplary embodiment can be implemented and utilized in connection with many other wind turbine applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine comprising:
a hub rotatable about a hub axis;
a blade coupled to said hub and defining a longitudinal axis, said blade comprising:
an inner blade portion comprising a first end and a second end, said inner blade portion coupled to said hub at said first end and extending radially outward from said hub to said second end; and
an outer blade portion comprising a first end and a second end, said first end of said outer blade portion pivotably coupled to said second end of said inner blade portion; and
a cable coupled to said inner blade portion at a first end of said cable and coupled to said outer blade portion at a second end of said cable, said cable extending within said inner blade portion and tensioned to provide an axial load on said outer blade portion.

2. The wind turbine in accordance with claim 1, wherein the longitudinal axis extends from said first end of said inner blade portion to said second end of said outer blade portion, and wherein said outer blade portion is configured to rotate about the longitudinal axis relative to said inner blade portion.

3. The wind turbine in accordance with claim 1, wherein the longitudinal axis extends from said first end of said inner blade portion to said second end of said outer blade portion, and wherein said first end of said inner blade portion is pivotably coupled to said hub such that said inner blade portion is configured to rotate about the longitudinal axis.

4. The wind turbine in accordance with claim 1, wherein said outer blade portion extends obliquely relative to said inner blade portion.

5. The wind turbine in accordance with claim 1 further comprising a rotatable element extending between said inner blade portion and said outer blade portion, said rotatable element comprising a first end coupled to said inner blade portion and a second end coupled to said outer blade portion.

6. The wind turbine in accordance with claim 5, wherein said rotatable element second end is rotatable relative to said rotatable element first end to facilitate rotating said outer blade portion relative to said inner blade portion.

7. The wind turbine in accordance with claim 5, wherein said rotatable element is an elastic flexure bearing.

8. The wind turbine in accordance with claim 7, wherein said second end of said rotatable element is rotatable at least +/− one degree relative to said first end of said rotatable element.

9. The wind turbine in accordance with claim 5 further comprising a support structure positioned within said inner blade portion, said rotatable element further comprising a body extending a length from said support structure to said outer blade portion, wherein said body is configured for elastic deformation about the length of said body.

10. The wind turbine in accordance with claim 1, wherein said cable is a first cable, and wherein said wind turbine further comprises a second cable extending within said inner blade portion and coupled to said inner blade portion and said outer blade portion, said first cable and said second cable each extending between said inner blade portion and said outer blade portion.

11. The wind turbine in accordance with claim 1, wherein said first end of said cable is coupled at said first end of said inner blade portion.

12. The wind turbine in accordance with claim 11, wherein said cable extends within said outer blade portion.

13. The wind turbine in accordance with claim 1 further comprising a rotatable element extending between said inner blade portion and said outer blade portion, said rotatable element comprising a first cup positioned at least partially within said inner blade portion, a second cup positioned at least partially within said outer blade portion, and a roller element extending between said first cup and said second cup.

14. The wind turbine in accordance with claim 13, wherein said second end of said cable is attached to said second cup.

15. The wind turbine in accordance with claim 13, wherein said rotatable element is a tapered roller bearing.

16. A blade for use in a wind turbine system comprising:
   an inner blade portion comprising a first end and a second end;
   an outer blade portion comprising a first end and a second end, said first end of said outer blade portion coupled to said second end of said inner blade portion;
   a rotatable element extending between said inner blade portion and said outer blade portion, said rotatable element comprising a first end coupled to said inner blade portion and a second end coupled to said outer blade portion, wherein said rotatable element second end is rotatable relative to said rotatable element first end to facilitate rotating said outer blade portion relative to said inner blade portion; and
   a cable coupled to said inner blade portion at a first end of said cable and coupled to said outer blade portion at a second end of said cable, said cable extending within said inner blade portion and tensioned to provide an axial load on said outer blade portion.

17. The blade in accordance with claim 16, wherein said rotatable element is an elastic flexure bearing.

18. The blade in accordance with claim 17, wherein said second end of said rotatable element is rotatable at least +/− one degree relative to said first end of said rotatable element.

19. The blade in accordance with claim 16 further comprising a support structure positioned within said inner blade portion, said rotatable element further comprising a flexible support member extending from said support structure to said outer blade portion.

\* \* \* \* \*